(12) United States Patent
Ye (10) Patent No.: US 11,867,350 B1
(45) Date of Patent: Jan. 9, 2024

(54) UNIVERSAL BALL JOINT ADJUSTING MECHANISM AND ADJUSTING METHOD THEREOF

(71) Applicant: Xiaohui Ye, Ningbo (CN)

(72) Inventor: Xiaohui Ye, Ningbo (CN)

( * ) Notice: Subject to any disclaimer, the term of this patent is extended or adjusted under 35 U.S.C. 154(b) by 0 days.

(21) Appl. No.: 18/195,395

(22) Filed: May 10, 2023

(30) Foreign Application Priority Data

Feb. 16, 2023 (CN) .......................... 202320345604.4

(51) Int. Cl.
| | | |
|---|---|---|
| *F16M 11/14* | (2006.01) | |
| *F16M 13/02* | (2006.01) | |
| *F16C 11/06* | (2006.01) | |
| *F41A 23/14* | (2006.01) | |

(52) U.S. Cl.
CPC ......... *F16M 11/14* (2013.01); *F16C 11/0623* (2013.01); *F16M 13/022* (2013.01); *F41A 23/14* (2013.01); *F16M 2200/022* (2013.01)

(58) Field of Classification Search
CPC ................. F16M 11/14; F16M 13/022; F16M 2200/022; F16C 11/0623
USPC ...... 248/181.1, 288.31, 288.51; 403/90, 122, 403/361; 89/37.01
See application file for complete search history.

(56) References Cited

U.S. PATENT DOCUMENTS

| | | | | |
|---|---|---|---|---|
| 8,021,060 | B2 * | 9/2011 | Sudhana ................ | F16M 11/14 396/428 |
| 8,282,055 | B2 * | 10/2012 | Burklin ................. | F16M 11/14 396/419 |
| 8,894,316 | B2 * | 11/2014 | Kallas .................... | F16M 11/14 403/90 |
| 10,571,211 | B2 * | 2/2020 | Johnson, Sr. ........... | F41A 23/14 |

* cited by examiner

*Primary Examiner* — Todd M Epps
(74) *Attorney, Agent, or Firm* — Bayramoglu Law Offices LLC (57) ABSTRACT

A universal ball joint adjusting mechanism and adjusting method thereof are provided. The universal ball joint adjusting mechanism includes a ball joint, an adjuster, and a brake. The ball joint is arranged inside the adjuster, and the adjuster is movably connected to the ball joint. An end of the brake is arranged in the adjuster, and can move in a first direction to apply pressure to the ball joint or be away from the ball joint. The ball joint has a large volume, and thus the adjuster is more stable during load bearing adjustment. In addition, an outer surface of the ball joint is in surface-to-surface contact with an inner surface of the adjuster.

17 Claims, 6 Drawing Sheets

UNIVERSAL BALL JOINT ADJUSTING MECHANISM AND ADJUSTING METHOD THEREOF

CROSS REFERENCE TO THE RELATED APPLICATIONS

This application is based upon and claims priority to Chinese Patent Application No. 202320345604.4, filed on Feb. 16, 2023, the entire contents of which are incorporated herein by reference.

TECHNICAL FIELD

The present disclosure relates to the technical field of gun accessories, and in particular, to a universal ball joint adjusting mechanism and adjusting method thereof.

BACKGROUND

A gunstock is also referred to as a gunstock support, a gun barrel support or a gun tripod/bipod, etc. Similar structures are also used for some devices that need to be supported and conveniently placed in different positions on an earth surface, such as a small photographic device, a measuring device, and the like. In order to adapt to different application environments, the part of the gunstock configured to lift a gun barrel should be flexibly adjusted in terms of angles.

Chinese utility model patent with the publication number of CN215003173U discloses a universal supporting mechanism, where a connecting member is fixed by a mechanical structure and is provided with a limiting portion, a universal ball joint is correspondingly provided with a second through hole, the limiting portion has a diameter greater than that of the second through hole, and the connecting member is cooperated with a connecting base to keep the universal ball joint at a recessed inner surface, such that the universal ball joint can realize rotational adjustment. However, the patent has no positioning structure for the universal ball joint, and cannot be applied to a gunstock having a positioning requirement for the universal ball joint. In addition, a plurality of limiting components or structures such as the second through hole, a gasket, a positioning bump, and others are provided, the positioning structure of the connecting member is complex, and there are high positioning requirements. After long-term use, the limiting components or structures may be worn to varying degrees, which will make the universal ball joint loose and cause a risk of separation from the recessed inner surface, thereby seriously affecting the positioning accuracy of a gun and resulting in a short service life.

SUMMARY

(I) Technical Problem to be Solved

In view of the above shortcomings and deficiencies of the prior art, the present disclosure provides a universal ball joint adjusting mechanism and adjusting method thereof, which solve the technical problem that a universal ball joint is prone to separation from a gunstock after an existing gunstock adjuster is worn.

(II) Technical Solution

To achieve the above objective, the universal ball joint adjusting mechanism according to the present disclosure includes:

a ball joint;
an adjuster, where the ball joint is arranged inside the adjuster, and the adjuster is movably connected to the ball joint; and
a brake, where an end of the brake is arranged in the adjuster and can move in a first direction to apply pressure to the ball joint or be away from the ball joint.

Optionally, an end portion of the brake close to the ball joint is configured as a braking member; and
the braking member has a cambered surface, and the cambered surface is configured to apply pressure to the ball joint.

Optionally, the brake further includes a rolling element and a braking unit; and
the rolling element is arranged inside the adjuster and located between the braking member and the braking unit, the braking unit is connected to the adjuster and can move in the first direction, and the movement of the braking unit can drive the rolling element and the braking member to move towards the ball joint.

Optionally, the rolling element and the braking unit are integrally or separately arranged.

Optionally, the brake further includes an elastic body and a braking unit; and
the elastic body is arranged inside the adjuster and located between the braking member and the braking unit, the braking unit is connected to the adjuster and can move in the first direction, and the movement of the braking unit can drive the elastic body and the braking member to move towards the ball joint.

Optionally, a limiting member is arranged on the braking unit, and the limiting member can limit maximum displacement of the braking unit in the adjuster.

Optionally,
the adjuster includes a first shell and a second shell;
an interior of the first shell and an interior of the second shell enclose an inner cavity, and the ball joint is arranged in the inner cavity; and
the braking unit is movably connected to the first shell or the second shell.

Optionally, the ball joint is provided with a rod portion, and the rod portion extends out of the inner cavity.

Optionally, a bottom end of the first shell is provided with a first limiting convex edge, and a bottom end of the second shell is provided with a second limiting convex edge; and
the first limiting convex edge and the second limiting convex edge form a limit on a rotation range of the adjuster relative to the rod portion.

Optionally, the ball joint is internally provided with a cavity, and the cavity communicates with the inner cavity.

Optionally, the adjuster further includes a housing, and an inner wall of the housing forms a spherical cavity in surface-to-surface contact with the ball joint; the ball joint is arranged in the spherical cavity; and the brake can abut against the inner wall of the housing to apply pressure to the ball joint by means of the housing.

Optionally, the housing includes a first housing and a second housing that enclose the spherical cavity; the first housing and the second housing are located on different sides of the ball joint, and the brake can abut against the first housing or the second housing so as to apply pressure to the ball joint by means of the first housing or second housing that is abutted.

Optionally, the first housing and the second housing are symmetrically arranged.

Optionally, the first housing and the second housing are asymmetrically arranged.

Optionally, one of the first housing and the second housing that can abut against the brake is movable, so as to apply pressure to the ball joint by moving when the brake abuts.

Optionally, the adjuster is internally provided with a housing clamping groove, a top end of the housing is provided with a housing clamping block, a top end of the housing clamping block abuts against the housing clamping groove, and a side end thereof can move in the housing clamping groove in the first direction.

Optionally, one of the first housing and the second housing that can abut against the brake is made of a deformable material, so as to apply pressure to the ball joint by its own deformation towards the ball joint when the brake abuts.

Further, the present disclosure further provides a gunstock support, which is provided with the universal ball joint adjusting mechanism described above.

Optionally, the gunstock support includes a lifting platform and a supporting member, where the universal ball joint adjusting mechanism is connected to the supporting member; and the lifting platform is mounted on the universal ball joint adjusting mechanism.

In addition, an adjusting method applied to the universal ball joint adjusting mechanism described above is provided, where the adjusting method includes the following steps:

adjusting the brake to be away from the ball joint until the adjuster can rotate relative to the ball joint;

adjusting, by the brake, the adjuster to move to a designated position; and adjusting the brake to apply pressure to the ball joint until the adjuster is braked.

(III) Beneficial Effects

The present disclosure has the beneficial effects that the ball joint is arranged inside the adjuster, and the adjuster is movably connected to the ball joint, such that the adjuster can rotate with the ball joint as a rotation center to a designated position. The ball joint has a large volume, and thus the adjuster is more stable during load bearing adjustment. In addition, an outer surface of the ball joint is in surface-to-surface contact with an inner surface of the adjuster, such that even if wear occurs, the degree of wear are roughly the same everywhere, which has little impact on positioning accuracy of the universal ball joint adjusting mechanism, and the ball joint is not prone to separation from a gunstock.

An end of the brake is arranged inside the adjuster, such that the brake and the adjuster can perform rotational adjustment synchronously, which facilitates one-handed operation. The brake can move in the first direction to apply pressure to the ball joint or be away from the ball joint, and the adjuster can be braked by using a friction force generated when the brake abuts against the ball joint. In the same way, keeping the brake away from the ball joint can reduce or eliminate the friction force between the brake and the ball joint, such that the adjuster can rotate relative to the ball joint, thereby adjusting the angle. The brake has a simple structure, which can quickly achieve the adjustment and positioning of the universal ball joint adjusting mechanism, and is suitable for a gunstock under adjustment and positioning requirements.

REFERENCE NUMERALS

100: First shell; 101: first limiting convex edge;
200: second shell; 201: second limiting convex edge; 202: housing clamping groove; 203: inner cavity; 204: braking member accommodating cavity; 210: connecting section; 220: clamping plate;
310: first housing; 320: second housing; 324: housing clamping block;
400: braking member;
500: brake; 510: handle; 520: braking unit; 521: limiting member; 530: rolling element;
610: rod portion; 620: ball joint;
700: lifting platform; 711: clamping port; 712: clamping groove.

DETAILED DESCRIPTION OF THE EMBODIMENTS

To facilitate a better understanding of the present disclosure, the present disclosure is described in detail below with reference to the accompanying drawings and specific implementations.

It should be noted that all the directional indications (such as upper, lower, left, right, front, and rear) in the embodiments of the present disclosure are merely used to explain relative position relationships, motion situations, and the like of the components in a specific gesture (as shown in the figures). If the specific gesture changes, the directional indication also changes accordingly.

Moreover, in the present disclosure, descriptions related to the terms such as "first" and "second" are only for the purpose of description and cannot be understood as indicating or implying relative importance, or implicitly indicating the number of the indicated technical features. Therefore, a feature limited by "first" or "second" may explicitly or implicitly include at least one such feature. In the descriptions of the present disclosure, "a plurality of" means at least two, for example, two or three, unless otherwise specifically limited.

In the present disclosure, unless otherwise clearly specified and limited, terms such as "connection" and "fixing" should be understood in a board sense. For example, "fixing" may be a fixed connection, a detachable connection, or integration; and "connection" may be a mechanical connection or an electrical connection; and may be a direct connection or an indirect connection implemented by using an intermediate medium, or may be internal communication between two elements or an interaction relationship between two elements, unless otherwise clearly limited. Those of ordinary skill in the art may understand specific meanings of the above terms in the present disclosure based on a specific situation.

Figure 1:
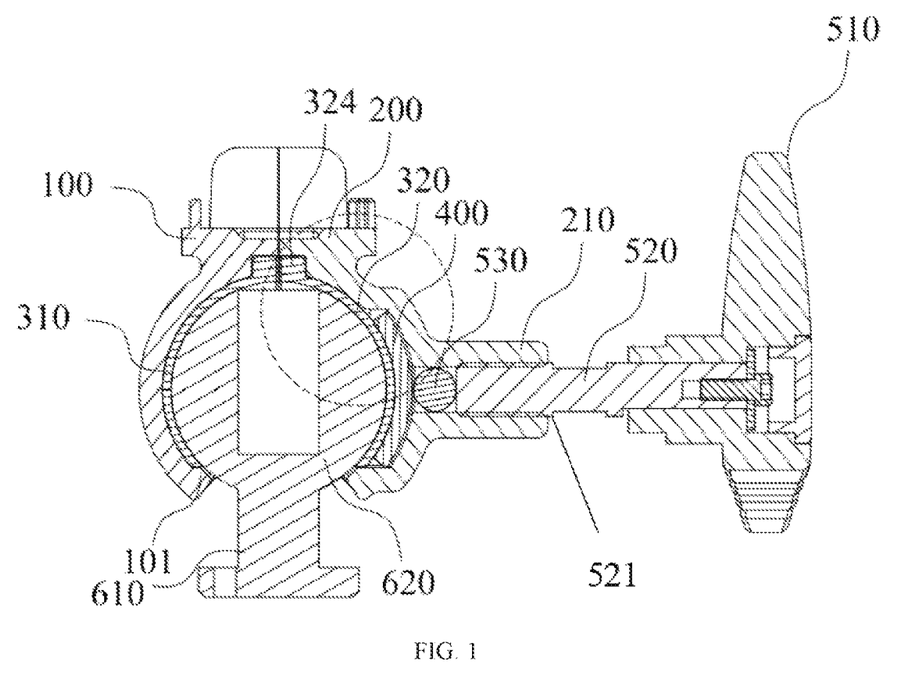
FIG. 1 is a schematic structural diagram of a universal ball joint adjusting mechanism according to the present disclosure.

Referring to FIG. 1, the present disclosure provides a universal ball joint adjusting mechanism, where the universal ball joint adjusting mechanism includes ball joint 620, adjuster, and brake 500. The ball joint 620 is arranged inside the adjuster, and the adjuster is movably connected to the ball joint 620. An end of the brake 500 is arranged in the adjuster, and the brake 500 can move in a first direction to apply pressure to the ball joint 620 or be away from the ball joint 620. The first direction is an axial direction of a braking unit 520, and preferably, the first direction passes through a ball center of the ball joint 620. In this implementation, the ball joint 620 is provided with rod portion 610, the rod portion 610 extends out of inner cavity 203 described in detail subsequently, the rod portion 610 is fixed by an external structure, and the structure that needs braking is the adjuster.

Further, the brake 500 includes handle 510 and braking unit 520; and the braking unit 520 is rod-shaped, or certainly, may be in the shape of a prism or in another shape. One end of the braking unit 520 is connected to the handle 510; and the other end of the braking unit 520 is arranged in the adjuster and can move in the first direction. In this implementation, the handle 510 and the braking unit 520 are connected to each other by a bolt, or may be integrally arranged to reduce a structural component. The other end of the braking unit 520 is arranged in the adjuster, such that the adjuster can be driven to operate synchronously by the brake 500, to facilitate adjustment. The braking unit 520 can move in the adjuster in the first direction, and the braking unit 520 provides pressure applied to the ball joint 620 or removes the pressure applied to the ball joint 620, such that the adjuster can be braked or subjected to braking relief.

The ball joint 620 is arranged inside the adjuster, and the adjuster is movably connected to the ball joint 620, such that the adjuster can rotate with the ball joint 620 as a rotation center to a designated position. The ball joint 620 has a large volume, and thus the adjuster is more stable during load bearing adjustment. In addition, an outer surface of the ball joint 620 is in surface-to-surface contact with an inner surface of the adjuster, such that even if wear occurs, the degrees of wear are roughly the same everywhere, which has little impact on positioning accuracy of the universal ball joint adjusting mechanism, and the ball joint 620 is not prone to separation from a gunstock. The surface-to-surface contact in the present disclosure does not require complete contact between the outer surface of the ball joint 620 and the inner surface of the adjuster, and braking can be achieved even if only partial contact is implemented. For example, braking can be achieved only by the abutment between the first housing 310 and the ball joint 620, which will be described in detail subsequently. Certainly, a larger contact area indicates higher braking stability, such that local wear can be avoided to a largest extent. An implementation of large-area surface-to-surface contact is preferred.

An end of the brake 500 is arranged inside the adjuster, such that the brake 500 and the adjuster can perform rotational adjustment synchronously, which facilitates one-handed operation. The brake 500 can move in the first direction to apply pressure to the ball joint 620 or be away from the ball joint 620, and the adjuster can be braked by using a friction force generated by the pressure of the brake 500 on the ball joint 620. In the same way, keeping the brake 500 away from the ball joint 620 can reduce or eliminate the friction force between the brake and the ball joint, such that the adjuster can rotate relative to the ball joint 620, thereby adjusting the angle. The brake 500 has a simple structure, which can quickly achieve the adjustment and positioning of the universal ball joint adjusting mechanism, and is suitable for a gunstock under adjustment and positioning requirements.

Figure 2:
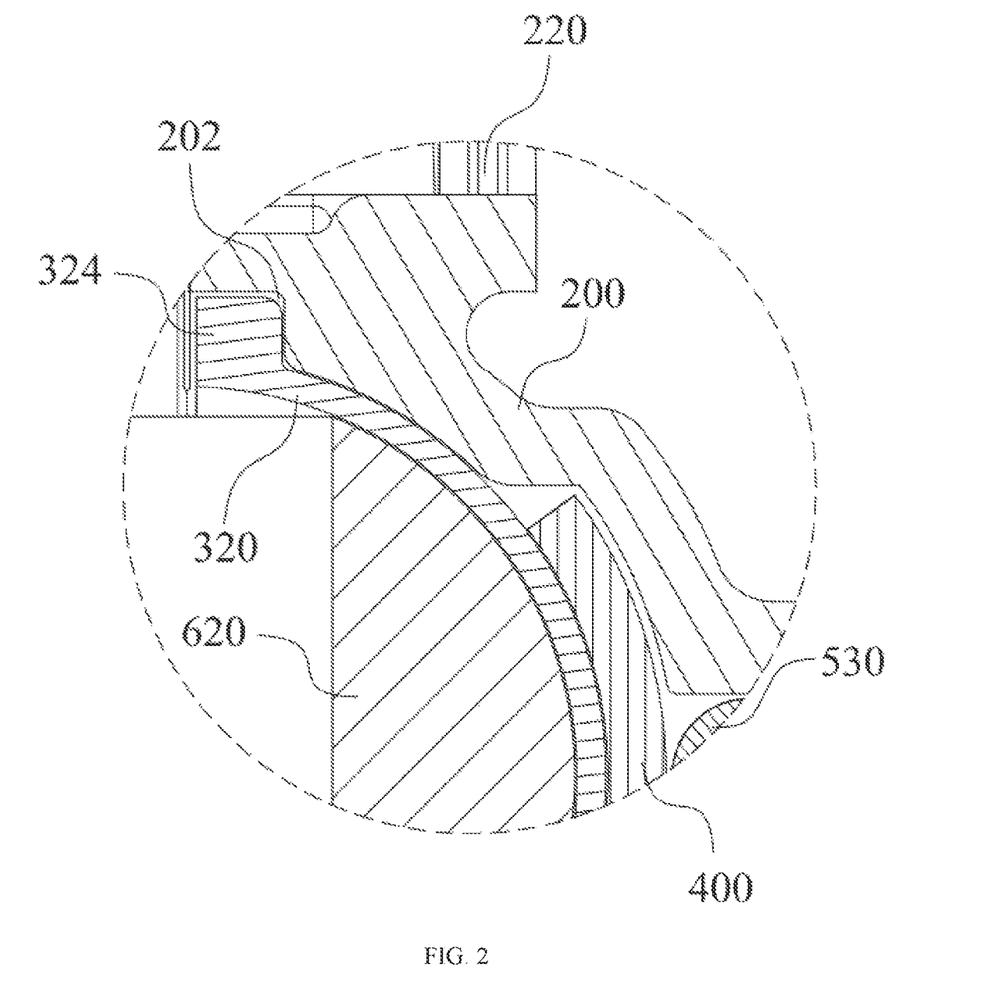
FIG. 2 is a partially enlarged view of FIG. 1.
Figure 3:
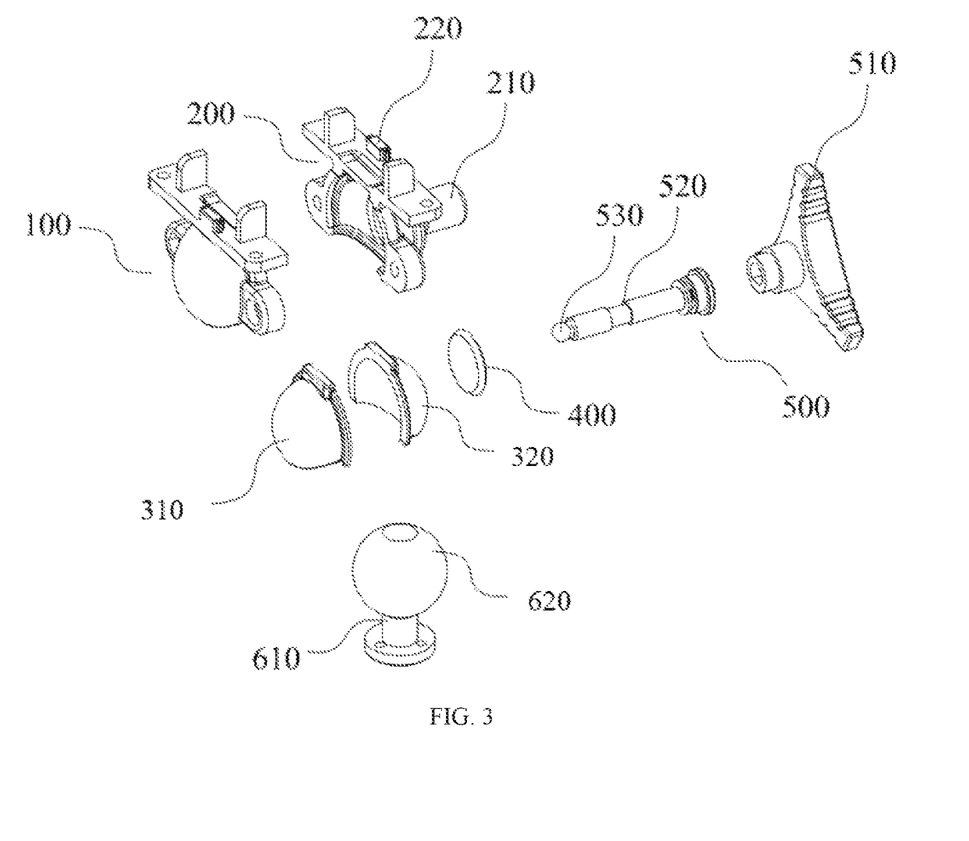
FIG. 3 is an exploded view of a universal ball joint adjusting mechanism according to the present disclosure.
Figure 4:
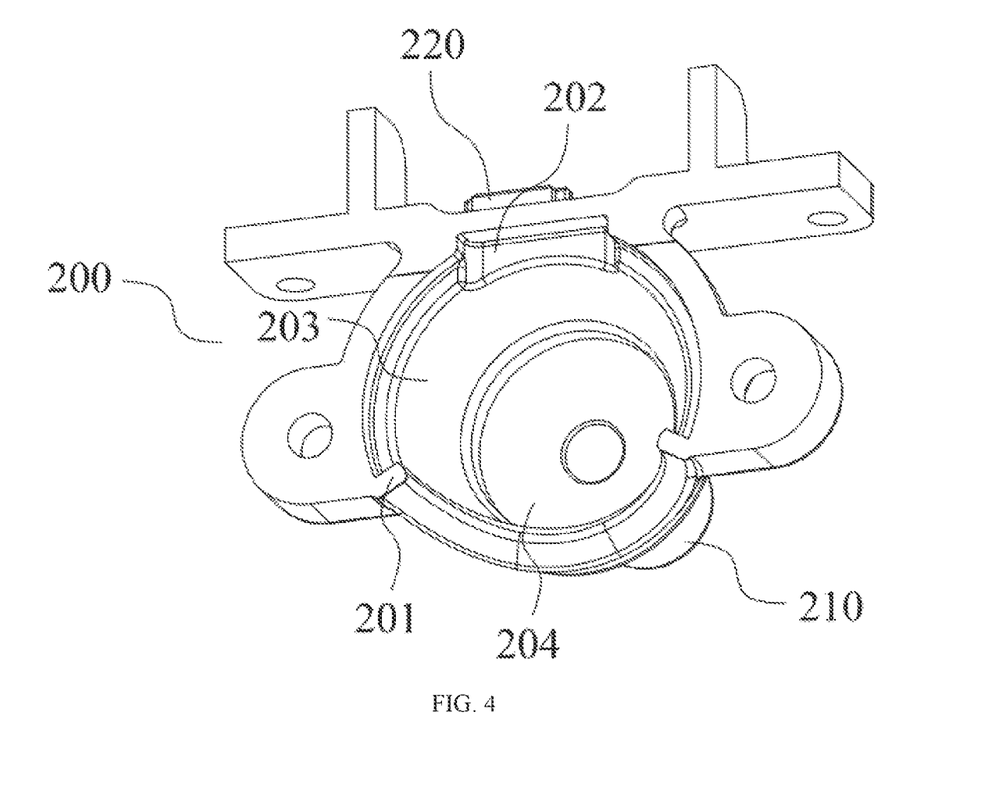
FIG. 4 is a schematic structural diagram of a second shell according to the present disclosure.

As shown in FIG. 3, an end portion of the brake 500 that is arranged inside the adjuster, i.e., an end portion of the brake 500 close to the ball joint 620, is configured as a braking member 400. The braking member 400 is located between the ball joint 620 and the braking unit 520. In this embodiment, the braking member 400 is separately arranged as the end portion of the brake 500. In other embodiments, the braking member 400 may be directly connected to the braking unit 520. The braking member 400 can move in the first direction. In this implementation, the braking member 400 is a disc with an arc-shaped cross-section. Therefore, the braking member 400 has a cambered surface, and the cambered surface matches the shape of an outer surface of the second housing 320 described in detail subsequently, such that the cambered surface of the braking member 400 close to the ball joint 620 can be in surface-to-surface contact with the outer surface of the second housing 320. This increases an abutment area between the braking member 400 and the outer surface of the second housing 320, helps the braking member 400 to transmit, by the second housing 320 during braking, pressure applied to the ball joint 620, and can reduce a stress at an abutment surface between the braking member 400 and the second housing 320 and a stress at an abutment surface between the second housing 320 and the ball joint 620, reduce the wear, prolong the service lives of the brake 500 and the ball joint 620, and ensure matching accuracy. Referring to FIGS. 2 and 4, based on the arrangement shape of the braking member 400, braking member accommodating cavity 204 is correspondingly provided in the adjuster, and a top surface and a bottom surface of the braking member 400 abut against an inner wall of the braking member accommodating cavity 204, so as to limit the braking member 400 in a vertical direction and improve the transmission stability. In addition, the braking member 400 can move in the first direction in the braking member accommodating cavity 204 to cooperate with the braking unit 520 to perform braking or braking relief on the ball joint 620. A specific dimension of the braking member accommodating cavity 204 may be set according to actual needs.

The brake 500 further includes a rolling element 530; and the rolling element 530 is arranged in the adjuster and located between the braking member 400 and the braking unit 520. In this implementation, the rolling element 530 may be a spherical, cylindrical or conical roller, or another structure that can be in line contact or point contact with the adjuster, and is preferably a spherical roller.

Specifically, in this embodiment, the braking unit 520 moves towards the ball joint 620, and can drive the rolling element 530 and the braking member 400 to move towards the ball joint 620. The braking unit 520 moves in a direction away from the ball joint 620, such that the abutment of the rolling element 530 and the braking member 400 towards the ball joint 620 is removed, and the adjuster can freely rotate on the ball joint 620. The rolling element 530 is in line contact or point contact with an inner wall of the adjuster, and the rolling element 530 is in point contact with both the braking member 400 and the braking unit 520. The line contact and the point contact can reduce a contact area between the braking unit 520 and the braking member 400, thereby reducing the wear. In addition, the contact area is small. Compared with that the braking unit 520 directly and continuously squeezes the braking member 400 when rotating, the point contact manner can reduce abnormal sounds generated during adjustment and improve user experience.

With the increase of the service time of the universal ball joint adjusting mechanism, the side of the braking member 400 close to the rolling element 530 may be worn due to material problems, but such wear does not affect the transmission stability. This is because the shape of the rolling element 530 formed on the braking member 400 by squeezing or wear is a hemispherical pit, and the pit is in surface-to-surface contact with the rolling element 530. This can be understood as that the rolling element 530 is partially trapped in the pit, and this wear does not affect the transmission of the braking unit 520, thereby greatly prolonging the service lives of the braking member 400 and the rolling element 530. Based on this, it is also possible to directly provide a pit in the braking member 400 or the braking unit 520.

Different from this embodiment in which the rolling element 530 and the braking unit 520 are separately arranged, in another embodiment, the rolling element 530 and the braking unit 520 are integrally arranged. An end of the braking unit 520 facing the ball joint 620 may be lathed into the shape of the rolling element 530 by a lathe, for example, the rolling element 530 is lathed into a hemisphere shape, such that the rolling element 530 can rotate synchronously with the braking unit 520 to perform braking or braking relief on the ball joint 620.

In addition, the adjuster includes first shell 100 and second shell 200 that are detachably connected to each other. An interior of the first shell 100 and an interior of the second shell 200 enclose an inner cavity 203, and the ball joint 620 is arranged in the inner cavity 203; and the braking unit 520 is movably connected to the first shell 100 or the second shell 200. In this implementation, a side of the second shell 200 close to the handle 510 is provided with connecting section 210, a through hole is formed in the connecting section 210, and the through hole communicates with the braking member accommodating cavity 204; and both the braking unit 520 and the rolling element 530 are arranged in the through hole.

The volume of the ball joint 620 wrapped by the adjuster is greater than a half of the volume of the ball joint 620, that is, most of the sphere is wrapped, such that the ball joint 620 can limit the adjuster in the vertical direction, thereby effectively avoiding a case that the adjuster is separated from the ball joint 620 during the adjustment.

A matching threaded section is correspondingly provided at a threaded joint of the braking unit 520 and the second shell 200, and a limiting member 521 is arranged on the braking unit 520. The limiting member 521 can abut against a side end face of the connecting section 210 close to the handle 510, to limit a maximum moving distance of the braking unit 520 in the first direction, thereby effectively avoiding a case that excessive pressure applied by the braking unit 520 to the ball joint 620 leads to component damage. The limiting member 521 may be plate-shaped, block-shaped, ring-shaped or in another irregular shape, provided that a function of limiting the braking unit 520 can be achieved. Certainly, the rolling element 530 may also be replaced with an elastic body, and the elastic body is arranged between the braking member 400 and the braking unit 520. The elastic body may be connected to the braking member 400 and/or the braking unit 520, or may be disconnected to (i.e., abut against) the braking member 400 and the braking unit 520. The elastic body may have an elastic structure such as rubber and a spring. The movement of the braking unit towards the ball joint pushes the elastic body and the braking member to move towards the ball joint until the braking member applies pressure to the ball joint to brake the adjuster, and the elastic body is in a continuous stressed state. When the braking is relieved, the braking unit 520 is rotated to move away from the ball joint, and if the elastic body is connected to the braking unit, the elastic body is pulled, thereby reducing the pressure applied to the ball joint 620 and enabling the adjuster to perform rotational adjustment. If the elastic body is disconnected to the braking unit, the elastic body returns to a natural state, and the adjuster can rotate relative to the ball joint 620. In addition, the braking unit 520 and the connecting section 210 are not limited to threaded connection, and may be connected to each other in a slidable manner. For example, in a structure similar to a ballpoint pen, a button is arranged on the handle 510, and the braking unit 520 includes an inner rod and an outer rod. After the button is pressed, the button is automatically positioned, and the inner rod moves towards the ball joint 620, so as to squeeze the braking member 400 for braking. The button is pressed again and rebounds to its original position, the inner rod returns to its original position, and the braking is relieved.

Further, the adjuster further includes first housing 310 and second housing 320, which enclose a spherical cavity, and the spherical cavity as an inner wall of the housing and also as the inner surface of the adjuster forms surface-to-surface contact with the ball joint 620. The first housing 310 is disposed between the first shell 100 and the ball joint 620; and the second housing 320 is disposed between the second shell 200 and the ball joint 620. The first housing 310 may be integrated with the first shell 100 to be a housing. The first housing 310 has certain elasticity and toughness, and can be restored to its original state after deformation, such that the first housing can be assembled with the ball joint 620; or the first housing may be separately arranged. In this implementation, the first housing 310 and the first shell 100 are detachably connected to each other to facilitate maintenance and replacement; the second housing 320 is operated in the same way, and details are not described again. In addition, the second housing 320 can increase an acting force area between the brake 500 and the ball joint 620 and enhance the transmission stability. Moreover, the first housing 310, the second housing 320 and the braking member 400 can all move in the first direction. Even if the ball joint 620 is worn, the first housing 310, the second housing 320 and the braking member 400 can compensate for a wear dimension to a certain extent, thereby ensuring the positioning stability during long-term use.

The second shell 200 is internally provided with housing clamping groove 202, and the housing clamping groove 202 communicates with the inner cavity 203. A top end of the second housing 320 is provided with housing clamping block 324, a top end of the housing clamping block 324 abuts against the housing clamping groove 202, and a side end thereof can move in the housing clamping groove 202 in the first direction. The housing clamping groove 202 enables the second housing 320 to move in the first direction, and a movement amount, i.e., a maximum distance for which the second housing 320 can move from a braked state to a braking relieved state, may be set according to actual needs. A gap dimension between the ball joint 620 and the braking member 400 is correspondingly set, such that the second housing 320 can be in full surface-to-surface contact with the ball joint 620 and the second shell 200, to enhance the transmission stability. Preferably, when a side end of the housing clamping block 324 abuts against the housing clamping groove 202, surface-to-surface abutment is implemented. Compared with the adjustment mode in which the second housing 320 cannot move in the first direction, when the adjuster is adjusted in the present disclosure, the second housing 320 can move in the first direction in the inner cavity 203, and the pressure applied by the second housing 320 to the ball joint 620 is reduced, such that the wear of the ball joint 620 and the second housing 320 can be greatly reduced during the adjustment, thereby prolonging the service life. During braking, the brake 500 moves towards the ball joint 620 and abuts against the second housing 320 to push the second housing 320 to move towards the ball joint 620, so as to apply pressure to the ball joint 620 by means of the housing. In summary, in this embodiment, the second housing 320 that can abut against the brake 500 can move in the first direction, so as to apply pressure to the ball joint 620 by a linear movement in the first direction when the brake 500 abuts. However, the present disclosure is not limited thereto, and the second housing 320 may also be pivotally connected to the second shell 200, that is, the second housing 320 is rotatable, and the abutment of the brake 500 pushes the second housing 320 to rotate into abutment against the ball joint 620, so as to be in large-area contact with the ball joint 620 and apply pressure to the ball joint. In addition, in another embodiment of the present disclosure, the second housing 320 may be further made of a deformable material, so as to apply pressure to the ball joint 620 by its own deformation towards the ball joint 620 when the brake 500 abuts. The first housing 310 is operated in the same way, and details are not described again.

In this implementation, the first housing 310 and the second housing 320 are symmetrically arranged with the ball joint 620 as a center, or may be asymmetrically arranged. The asymmetrical arrangement includes setting of a distance between the first housing 310 (or the second housing 320) and a ball center of the ball joint 620, setting of volume sizes of the first housing 310 and the second housing 320, etc., and may be set according to actual needs.

The bottom of the first shell 100 is provided with first limiting convex edge 101, the bottom of the second shell 200 is provided with second limiting convex edge 201. The first limiting convex edge 101 can limit the first housing 310 in the vertical direction, and the second limiting convex edge 201 can limit the second housing 320 and the braking member 400 in the vertical direction. The bottom shapes of the first limiting convex edge 101 and the second limiting convex edge 201 can be adapted to the shape of the rod portion 610, for example, are set as arc shapes to increase the contact area and reduce a local collision force. In addition, a distance between the first limiting convex edge 101 and the second limiting convex edge 201 is greater than a dimension of the rod portion 610, such that the first limiting convex edge 101 and the second limiting convex edge 201 form a limit on a rotation range of the adjuster relative to the rod portion 610. In addition, the ball joint 620 is internally provided with a cavity, and the cavity communicates with the inner cavity 203. To further reduce the wear of the ball joint 620, grease may be injected into the cavity. After the ball joint 620 is provided with the cavity, a certain gap is reserved between the ball joint 620 and the first housing 310 and the second housing 320. During the rotation of the adjuster, the grease can flow out of the gap, and the grease remains in the gap between the ball joint 620 and the first housing 310 (and the second housing 320), thereby reducing the wear of the ball joint 620.

Certainly, the embodiment specifically described above is not the only way to implement the present disclosure. For example, the housing may be removed and the ball joint 620 may be directly placed in the inner cavity 203 of the shell. In this case, the inner cavity 203 of the shell, as the inner surface of the adjuster, is in surface-to-surface contact with the outer surface of the ball joint 620. Besides, the braking member 400 directly applying pressure to the ball joint 620 means that the braking member 400 directly abuts against the ball joint 620, and the cambered surface of the braking member 400 matches the shape of the outer surface of the ball joint 620.

Figure 5:
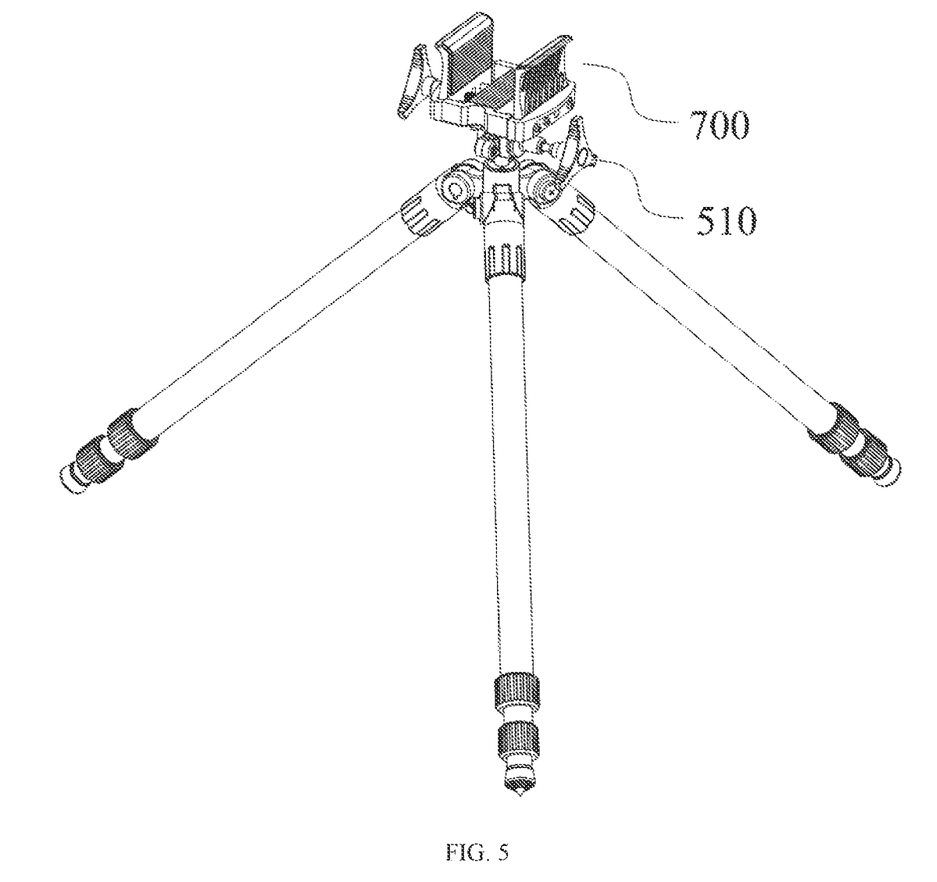
FIG. 5 is a schematic structural diagram of a gunstock support according to the present disclosure.
Figure 6:
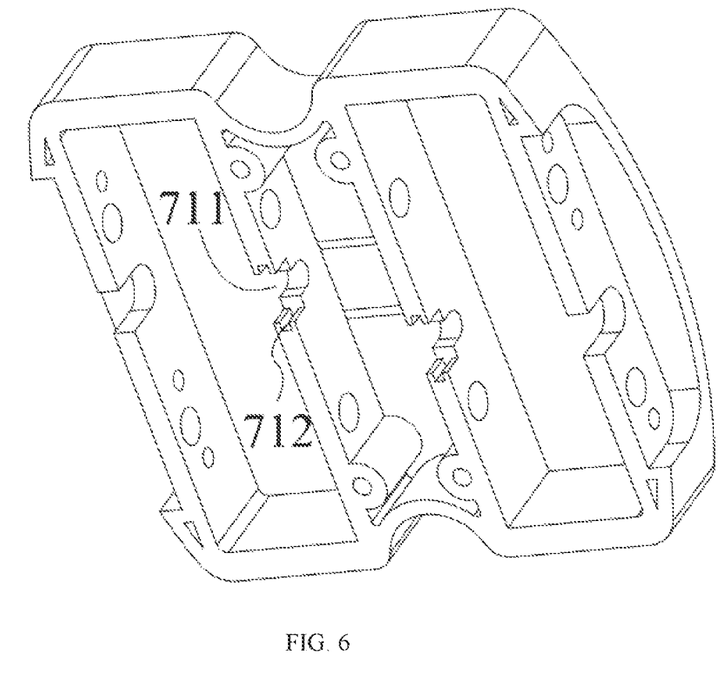
FIG. 6 is a schematic structural diagram of a frame according to the present disclosure.

Referring to FIGS. 5 and 6, the present disclosure further provides a gunstock support, which is provided with the universal ball joint adjusting mechanism described above. The gunstock support includes lifting platform 700 and a supporting member, where the universal ball joint adjusting mechanism is connected to the supporting member; and the lifting platform 700 is mounted on the universal ball joint adjusting mechanism. The supporting member may be a supporting platform or a suspender, provided that the supporting member can achieve a function such as supporting or hoisting the universal ball joint adjusting mechanism. In this implementation, a plurality of legs are selected as the supporting member, a plurality of legs are hinged to a bottom end of the universal ball joint adjusting mechanism, and the plurality of legs are uniformly arranged with the ball joint 620 as the center; and the lifting platform 700 is detachably connected to a top end of the universal ball joint adjusting mechanism. In this embodiment, a bottom surface of the lifting platform 700 is provided with clamping port 711 and clamping groove 712, the second housing 200 is correspondingly provided with clamping plate 220, and the clamping plate 220 can be clamped into the clamping port 711 and the clamping groove 712, such that the lifting platform 700 can be quickly assembled or disassembled.

In addition, an adjusting method applied to the universal ball joint adjusting mechanism described above is provided, where the adjusting method includes the following steps.

The handle 510 is held with one hand, and the handle 510 is rotated to keep the braking unit 520 away from the ball joint 620 until the adjuster can rotate relative to the ball joint 620, such that the braking of the adjuster is relieved.

The handle 510 is rotated with the ball joint 620 as the rotation center, and the adjuster can correspondingly move to a designated position.

The handle 510 is reversely rotated to make the braking unit 520 close to the ball joint 620 until the braking member 400 applies pressure to the ball joint 620 and the ball joint 620 can no longer rotate, thereby completing the braking of the adjuster.

During the entire adjustment, the braking and braking relief of the universal ball joint adjusting mechanism can be operated manually with one hand, which is convenient to operate. Certainly, the operation may also be performed by an external manipulator or a similar structure. In addition, during the adjustment, the braking or braking relief can be performed only by rotating the handle 510, and the adjustment mode is simple, less time-consuming and highly practical. Even if wearing occurs after long-time use, based on the structural design of surface-to-surface contact according to the present application, local stress concentration can be avoided, and the degrees of wear of worn surfaces are roughly the same. In addition, the inner cavity 203 and the braking member accommodating cavity 204 are provided in the adjuster, such that the first housing 310, the second housing 320 and the braking member 400 can move in the first direction, and adaptive compensation can be performed for a wear dimension during braking, thereby ensuring the stability during positioning.

It should be understood that the above description of the specific embodiments of the present disclosure is only intended to illustrate the technical route and characteristics of the present disclosure, and its purpose is to enable those skilled in the art to understand the content of the present disclosure and implement it accordingly. However, the present disclosure is not limited to the above-mentioned specific implementations. Any changes or modifications made within the scope of the claims of the present disclosure shall fall within the protection scope of the present disclosure.

What is claimed is:

1. A universal ball joint adjusting mechanism, comprising:
   a ball joint;
   an adjuster, wherein the ball joint is arranged inside the adjuster, and the adjuster is movably connected to the ball joint;
   a brake, wherein an end of the brake is arranged in the adjuster and moves in a first direction to apply pressure to the ball joint or be away from the ball joint; and
   a braking member at an end portion of the brake; wherein
   the end portion is adjacent to the ball joint;
   the braking member has a cambered surface, and the cambered surface is configured to apply pressure to the ball joint;
   the brake further comprises a rolling element and a braking unit;
   the rolling element is arranged inside the adjuster and located between the braking member and the braking unit, the braking unit is connected to the adjuster and moves in the first direction, and a movement of the braking unit drives the rolling element and the braking member to move towards the ball joint;
   the adjuster comprises a first shell and a second shell;
   an interior of the first shell and an interior of the second shell enclose an inner cavity, and the ball joint is arranged in the inner cavity; and
   the braking unit is movably connected to the first shell or the second shell.

2. The universal ball joint adjusting mechanism according to claim 1, wherein the rolling element and the braking unit are integrally or separately arranged.

3. The universal ball joint adjusting mechanism according to claim 1, wherein the brake further comprises an elastic body and a braking unit, wherein
   the elastic body is arranged inside the adjuster and located between the braking member and the braking unit, the braking unit is connected to the adjuster and moves in the first direction, and a movement of the braking unit drives the elastic body and the braking member to move towards the ball joint.

4. The universal ball joint adjusting mechanism according to claim 1, wherein a limiting member is arranged on the braking unit, and the limiting member limits a maximum displacement of the braking unit in the adjuster.

5. The universal ball joint adjusting mechanism according to claim 1, wherein the ball joint is provided with a rod portion, and the rod portion extends out of the inner cavity.

6. The universal ball joint adjusting mechanism according to claim 5, wherein a bottom end of the first shell is provided with a first limiting convex edge, and a bottom end of the second shell is provided with a second limiting convex edge; and
   the first limiting convex edge and the second limiting convex edge form a limit on a rotation range of the adjuster relative to the rod portion.

7. The universal ball joint adjusting mechanism according to claim 1, wherein the ball joint is internally provided with a cavity, and the cavity communicates with the inner cavity.

8. The universal ball joint adjusting mechanism according to claim 1, wherein the adjuster further comprises a housing, and an inner wall of the housing forms a spherical cavity in surface-to-surface contact with the ball joint; and
   the ball joint is arranged in the spherical cavity; and the brake abuts against the housing to apply pressure to the ball joint by means of the housing.

9. A gunstock support, comprising the universal ball joint adjusting mechanism according to claim 1.

10. The gunstock support according to claim 9, wherein the gunstock support comprises a lifting platform and a supporting member, wherein the universal ball joint adjusting mechanism is connected to the supporting member; and the lifting platform is mounted on the universal ball joint adjusting mechanism.

11. An adjusting method applied to the universal ball joint adjusting mechanism according to claim 1, comprising the following steps:
   adjusting the brake to be away from the ball joint until the adjuster rotates relative to the ball joint;
   adjusting, by the brake, the adjuster to move to a designated position; and
   adjusting the brake to apply pressure to the ball joint until the adjuster is braked.

12. A universal ball joint adjusting mechanism, comprising:
   a ball joint;
   an adjuster, wherein the ball joint is arranged inside the adjuster, and the adjuster is movably connected to the ball joint; and
   a brake, wherein an end of the brake is arranged in the adjuster and moves in a first direction to apply pressure to the ball joint or be away from the ball joint;
   wherein
   the adjuster further comprises a housing, and an inner wall of the housing forms a spherical cavity in surface-to-surface contact with the ball joint;
   the ball joint is arranged in the spherical cavity; and the brake abuts against the housing to apply pressure to the ball joint by means of the housing; and
   the housing comprises a first housing and a second housing, the first housing and the second housing enclose the spherical cavity; the first housing and the second housing are located on different sides of the ball joint, and the brake abuts against the first housing or the second housing to apply pressure to the ball joint by means of the first housing or second housing.

13. The universal ball joint adjusting mechanism according to claim 12, wherein the first housing and the second housing are symmetrically arranged.

14. The universal ball joint adjusting mechanism according to claim 12, wherein the first housing and the second housing are asymmetrically arranged.

15. The universal ball joint adjusting mechanism according to claim 12, wherein
   one of the first housing and the second housing is movable to apply pressure to the ball joint by moving when the brake abuts, wherein one of the first housing and the second housing abuts against the brake.

16. The universal ball joint adjusting mechanism according to claim 15, wherein the adjuster is internally provided with a housing clamping groove, a top end of the housing is provided with a housing clamping block, a top end of the housing clamping block abuts against the housing clamping groove, and a side end of the housing clamping block moves in the housing clamping groove in the first direction.

17. The universal ball joint adjusting mechanism according to claim 12, wherein
one of the first housing and the second housing is made of a deformable material to apply pressure to the ball joint by a deformation of one of the first housing and the second housing towards the ball joint when the brake abuts, wherein one of the first housing and the second housing abuts against the brake.

* * * * *